Patented Nov. 13, 1928.

1,691,427

UNITED STATES PATENT OFFICE.

HENRI BARTHÉLEMY, OF PARIS, FRANCE, ASSIGNOR TO SOCIÉTÉ INDUSTRIELLE DES MATIERES PLASTIQUES, OF PARIS, FRANCE.

PROCESS FOR THE MANUFACTURE OF PRODUCTS OF CONDENSATION OF UREA AND FORMALDEHYDE AND THE PRODUCTS THUS OBTAINED.

No Drawing. Application filed September 16, 1926, Serial No. 136,003, and in France September 24, 1925.

It has been observed that the action of acids upon concentrated solutions of the methylol-ureas or the gums which are obtained by the process described in my prior application, No. 70,998, filed November 23, 1925, is relatively gross and excessive, which is prejudicial to the regular production of the commercial products. Even when employing slightly dissociated acids such as acetic acid, the alteration caused by the sudden introduction of a certain quantity of hydrogen ions will not allow the syrup to be preserved for the time necessary for complex and difficult treatments. In fact, the syrup will thicken and will form a semi-solid mass after a time which is often short and which obviously depends upon the amount of the H ions in use.

It is thus evident that the utilization of a substance from which the H ions have been removed but which is adapted by subsequent transformation to produce such ions at the proper time, would constitute a marked technical improvement in the transformation of the syrup into an irreversible colloid, by permitting the treatment of the said syrup before it forms a semi-solid mass.

I have discovered that the organic anhydrides will serve for this purpose, and chiefly the acetic anhydride. It is a known fact that the transformation of acetic anhydride into acid by the action of water is not instantaneous, and there are formed two well-defined layers which may last for a long time in the cold state; in the case of benzoic anhydride this action is still more evident.

The present invention thus relates to the utilization, in the cold state or at moderate temperatures, of organic anhydrides as agents adapted to modify—with the proper delay—the amount of hydrogen ions either in the syrup obtained by the process described in my above identified application, or in the concentrated syrupy solutions of the methylol-ureas obtained by the Einhorn and Hamburger process or by any other analogous process which utilizes calcium oxide, strontium oxide or the like instead of barium oxide.

In this manner, acetic anhydride will first render the paste fluid, by reason of its tensioactive power i. e., the property which it possesses of decreasing the superficial tension of liquids with which it is mixed. The moulds containing the mixture are then raised to the proper temperature in order that the anhydride may become destroyed by the action of the small amount of water therein, and this will disengage within the body of the substance, and in a very gradual and progressive manner, the acetic acid which is necessary to produce the acid reaction.

I have further observed that it is possible to still further increase the retarding effect of the acetic anhydride upon the formation of H ions, by the addition of an alcohol. It is a known fact that the alcohols will diminish the dissociation of water and, consequently, retard the transformation of the anhydrides into acids by reason of the reduction of the concentration of the H ions; and the same is true for numerous other substances which are available for this purpose, such as sodium phosphate, acetate, glycocollate, and the like.

The invention is further characterized in that since the anhydrides combine with a part of the water which is disengaged during condensation, a much more rapid hardening is obtained.

I claim:

1. A process of manufacturing condensation products from urea and formaldehyde, comprising the step of treating a syrupy solution of the initial condensation product of urea and formaldehyde with an organic anhydride of the aliphatic series.

2. A process of manufacturing condensation products from urea and formaldehyde, comprising the step of treating a syrupy solution of the initial condensation product of urea and formaldehyde with an organic anhydride of the aliphatic series in the presence of an agent which will retard the transformation of the anhydride into acid.

3. A process of manufacturing condensation products from urea and formaldehyde, comprising the step of treating a syrupy solution of the initial condensation product of urea and formaldehyde with an organic anhydride of the aliphatic series in the presence of an alcohol.

4. A process of manufacturing condensation products from urea and formaldehyde, comprising the step of treating a syrupy solution of the initial condensation product of urea and formaldehyde with acetic anhydride.

5. A process of manufacturing condensation products from urea and formaldehyde, comprising the step of treating a syrupy solution of the initial condensation product of urea and formaldehyde with acetic anhydride in the presence of an agent which will retard the transformation of the anhydride into acetic acid.

6. A process of manufacturing condensation products from urea and formaldehyde, comprising the step of treating a syrupy solution of the initial condensation product of urea and formaldehyde with acetic anhydride in the presence of an alcohol.

Signed at Paris, Seine, France, this seventh day of September A. D. 1926.

HENRI BARTHÉLEMY.